United States Patent [19]

Schmid et al.

[11] 4,295,577
[45] Oct. 20, 1981

[54] ANTI-THEFT DEVICE FOR LIQUID STORAGE TANKS

[76] Inventors: Michael G. Schmid, 5383 North St., Rte. 48, Lebanon, Ohio 45036; Roger W. Hurt, 5604 Lesourdsville-Westchester Rd., Hamilton, Ohio 45011

[21] Appl. No.: 152,672
[22] Filed: May 23, 1980
[51] Int. Cl.³ .......................... B65D 3/00; B67C 3/00
[52] U.S. Cl. ................................................ 220/86 AT
[58] Field of Search ............ 220/86 R, 86 AT; 85/71, 85/86

[56] References Cited

U.S. PATENT DOCUMENTS

| | | | |
|---|---|---|---|
| 1,984,590 | 12/1934 | Maddin | 220/86 AT |
| 3,002,649 | 10/1961 | Turley | 220/86 AT |
| 3,951,297 | 4/1976 | Martin | 220/86 AT |

Primary Examiner—George T. Hall
Attorney, Agent, or Firm—Simon Groner

[57] ABSTRACT

An anti-theft device for preventing unauthorized removal of liquid from large volume liquid storage tanks. The anti-theft device comprises a tube-like stanchion positioned within the fill tube associated with the storage tank, such that the lower end of the stanchion rests upon the bottom of the tank. The stanchion includes a grid-like baffle positioned above the highest liquid tank level for preventing insertion of a siphon tube. A plurality of crimped projections extending inwardly from the inner circumference of the speed tube positioned between the stanchion and the fill tube to prevent upward withdrawal of the stanchion from within the fill tube. The speed tube is held in place by means of a rotatable collar threadedly secured to the upper end of the fill tube, and locked in place by means of a keyed set screw.

3 Claims, 7 Drawing Figures

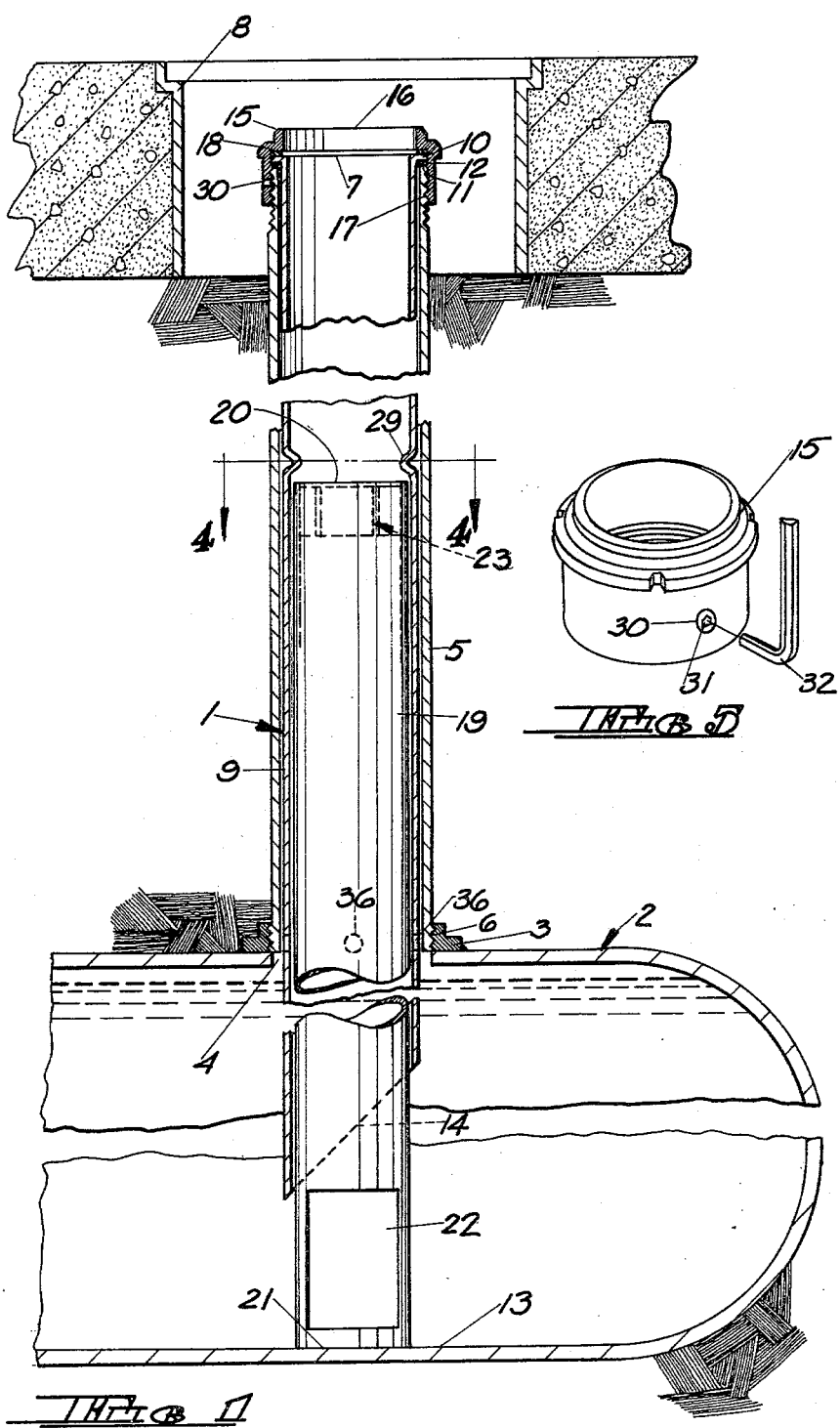

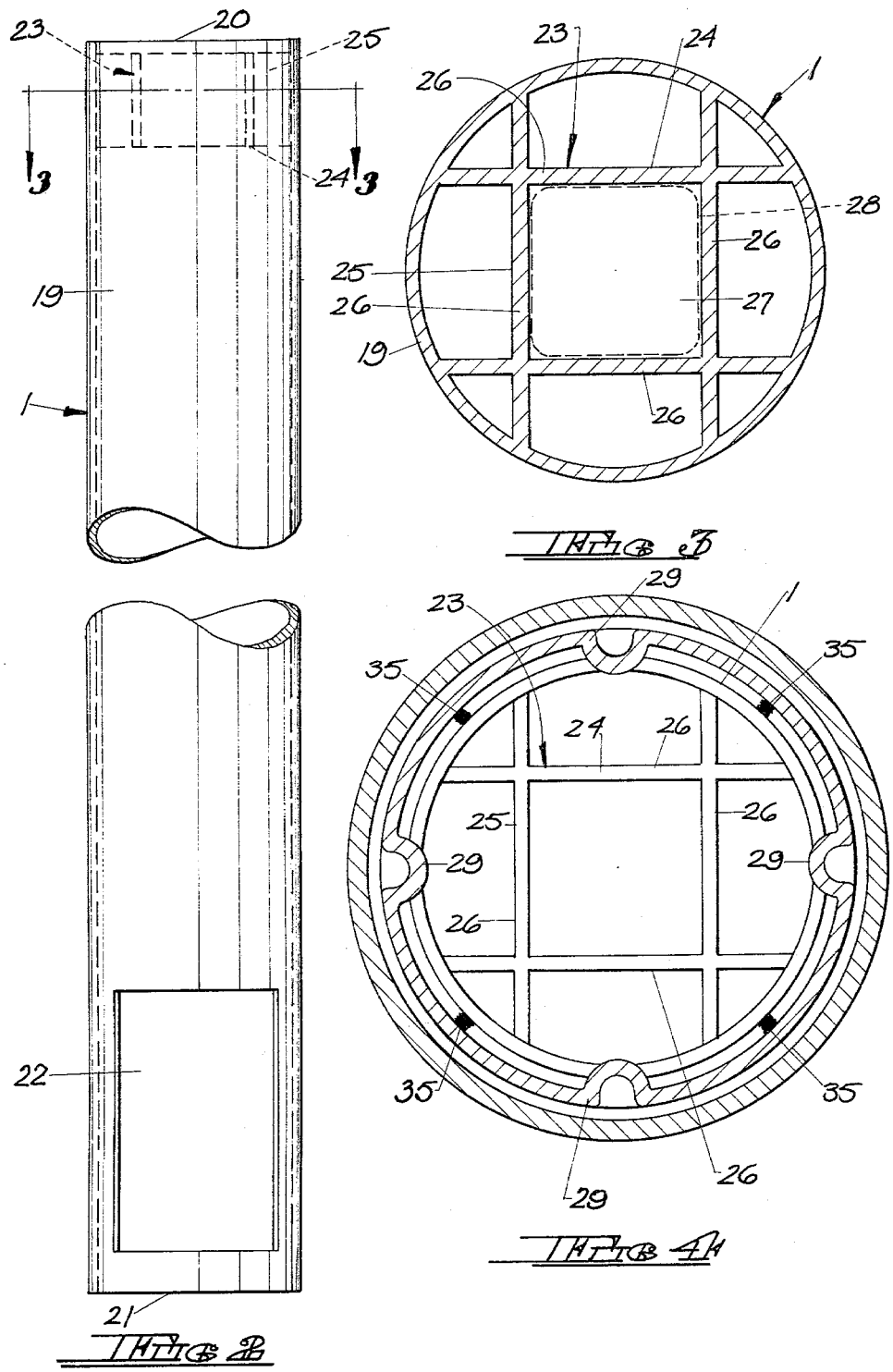

ANTI-THEFT DEVICE FOR LIQUID STORAGE TANKS

SUMMARY OF THE INVENTION

The present invention relates generally to devices for preventing the unauthorized withdrawal of liquids from liquid holding tanks, and more particularly to an anti-theft device for preventing the unauthorized withdrawal of liquids contained in existing underground storage tanks.

It has recently been observed that with the rising cost of petrochemicals, particularly vehicle fuels and the like, theft of such liquids from underground storage tanks and the like have increased alarmingly. Although not generally publicized by the petrochemical industry, a would-be thief may easily and quickly siphon a considerable quantity of fuel, for example, from an underground storage tank in a service station with only a conduit, simple pump and transport tanker truck. The fuel may then be marketed at less than wholesale price at a considerable profit to the thief.

A common method of theft involves the insertion of a generally flexible siphon conduit into the underground storage tank fill tube such that the lower end of the siphon conduit extends to the bottom of the storage tank. A similar method of operation has long been practiced for siphoning the fuel from an automobile fuel tank, for example. In this latter case, numerous means have been proposed for obstructing the fill pipe to prevent the entrance of a siphon conduit. For example, U.S. Pat. No. 1,995,007 issued Mar. 19, 1935 to P. L. Myers illustrates a theft preventer for gasoline tanks comprising a plurality of spaced generally cylindrical baffle plates permanently mounted within the fill tube. Analogous arrangements are described in U.S. Pat. No. 3,002,649 issued Oct. 3, 1961 to H. M. Turley and U.S. Pat. No. 3,888,381 issued June 10, 1975 to W. B. Russell, Jr., where a spring-like device is frictionally secured within the fill tube, and serves to prevent the passage of a siphon conduit.

Unfortunately, all of these proposed devices may be easily circumvented by merely forcing the anti-theft device obstruction downwardly through the fill tube into the tank. Consequently, such devices have not proved satisfactorily adaptable for use in a large volume underground liquid storage tank, for example, where the fill tube is generally straight, and easily accessible to a pipe or rod which can be used to force the obstruction downwardly. Likewise, such prior art anti-theft devices may generally be drawn out of the fill tube with the application of sufficient force, which due to the heavy-duty construction of such large volume underground storage tanks, usually presents no problem.

It has also been found that many types of prior art anti-theft devices prevent authorized access to the tank contents, such as when the tank level must be measured by means of a measuring rod or the like, or when adulterated tank contents, for example, must be removed and replaced.

While it is recognized that no anti-theft device can completely prevent determined efforts to gain unauthorized access to the tank, it is generally acknowledged that any device which lengthens the time the would-be thief must devote to circumventing the anti-theft means increases the possibility of detection and capture, and, consequently, acts as a deterrent.

The present invention seeks to overcome the disadvantages of prior art theft prevention devices, particularly in connection with existing underground large volume liquid storage tanks of the type having a liquid fill opening positioned on the upper surface of the tank, a hollow fill tube extending vertically from the opening, and filling means associated with the upper end of the fill tube for introducing liquid into the tank. Such arrangements often also include a speed or static tube positioned concentrically inside the fill tube to permit gasoline to be dropped near the bottom of the tank, as well as to reduce vapor loss and eliminate static charge buildup.

In a preferred embodiment, the present invention comprises an elongated hollow tube-like stanchion being configured to rest upon the bottom of the liquid storage tank and including one or more openings to permit flow of the liquid from the fill tube to the tank interior. Means are positioned within the stanchion for preventing theft of the liquid from the tank, these means generally comprising means for obstructing the interior of the stanchion to the introduction of a siphon tube of greater than a predetermined size. The obstructing means, which may comprise a grid-like baffle plate is positioned so as to be spaced above the highest liquid level within the tank. The hollow speed tube, which is positioned concentrically between the fill tube and the stanchion, includes a plurality of inwardly extending projections positioned above the upper end of the stanchion to prevent upward withdrawal of the stanchion from the fill tube. A rotatable collar threadedly secures the fill tube to the speed tube and includes a set screw extending laterally through the collar engaging the fill tube. The set screw is removable only by means of a specially keyed removal tool, to prevent unauthorized removal of the securing rotatable collar. The wall of the speed tube is also provided with one or more openings positioned above the highest liquid level in the tank to prevent removal of the tank contents by vacuum pumping.

Other features of the invention, including the details for applying the anti-theft device of the present invention to an existing underground liquid storage tank, will become apparent from the detail description which follows.

BRIEF DESCRIPTION OF THE DRAWING

FIG. 1 is a fragmentary cross-sectional side elevation view of a typical large volume underground liquid storage tank employing the anti-theft device of the present invention.

FIG. 2 is a fragmentary side elevation view of the anti-theft device of the present invention.

FIG. 3 is a cross-sectional view taken along section line 3—3 of FIG. 2.

FIG. 4 is a cross-sectional view taken along section line 4—4 of FIG. 1.

FIG. 5 is a fragmentary enlarged front perspective view of the securing collar illustrating the keyed set screw means.

DETAILED DESCRIPTION

Figure 6:
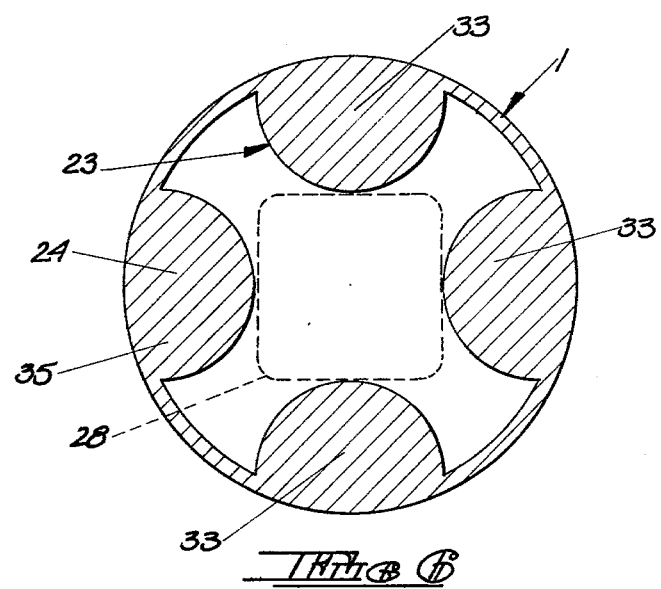
FIG. 6 is a transverse cross-sectional view illustrating an alternative embodiment of the baffle means of the anti-theft device of the present invention.

The anti-theft device of the present invention, shown generally at 1, is illustrated in FIG. 1 in connection with a typical installation for a large volume underground liquid storage tank, shown generally at 2. It will be understood that while for purposes of an exemplary showing, anti-theft device 1 has been described and illustrated in connection with a storage tank of the type that is installed underground, the invention will find equal applicability to other types of liquid storage tanks, such as above ground installations, for example. The typical type of underground installation illustrated in FIG. 1 comprises a generally cylindrical storage tank 2 fixedly mounting an annular threaded mounting collar 3 secured to the upper surface of the tank, and communicating with liquid fill opening 4. Tank 2 may be constructed of any suitable material such as metal, fiberglass, concrete, or the like.

A generally, cylindrical hollow fill tube 5 extends upwardly from opening 4, with the lower end 6 of fill tube 5 threadedly engaging the interior threads of mounting collar 3. The upper end of fill tube 5 terminates in mounting means comprising an opening 7 configured to mate with a McDonald or other pressurized or unpressurized filling structure associated with a supply tank truck, not shown.

The upper end of fill tube 5 may be positioned at or slightly below ground level within a suitable recessed cylindrical well 8. Well 8 may also be provided with a suitable circular cover or closure, not shown, as is well understood in the art.

A generally cylindrical thin-walled speed tube 9 is coaxially positioned within fill tube 5, and includes an outwardly flanged portion 10 at its upper end which rests on the upper edge or lip 11 of fill tube 5. A suitable insulating or sealing gasket 12 may also be provided between flange 10 of the speed tube and upper edge 11 of the fill tube, as desired. The lower end of speed tube 9 is spaced from inner surface 13 of the bottom portion of tank 2, and is angularly disposed as at 14 to direct and disperse the liquid as the tank is being filled. It will be understood that speed tube 9 may be fabricated of any suitable non-ferrous material such as aluminum or the like.

Flange 10 of speed tube 9 is pressed tightly against the upper edge 11 of fill tube 5 by means of an annular collar or securing ring 15 having an opening 16 which threadedly engages the upper end of fill tube 5 as at 17. An annular gasket 18 of rubber or other suitable material may be provided between collar 15 and the upper surface of flange 10 of the speed tube, as required.

The theft-preventing device 1 of the present invention, as best shown in FIG. 2 and FIG. 3, comprises a generally cylindrical elongated hollow tube-like stanchion 19 positionable within fill tube 5. As best illustrated in FIG. 1, stanchion 19 is dimensioned such that the upper end 20 of the stanchion extends above the maximum liquid level in tank 2 when the lower end 21 of the stanchion is resting upon the bottom surface 13 of the tank. In a preferred embodiment, the length of stanchion 19 will be such that the upper end 20 is positioned for easy access from opening 16 of fill tube 5 so that the anti-theft device 1 may be removed by authorized personnel in the event the contents of tank 2 must be removed for the reasons set forth hereinabove. As noted, the lower end 21 of stanchion 19 is configured to rest upon the bottom surface 13 of liquid storage tank 2, and also includes one or more generally rectangular openings 22 to permit flow of the liquid from fill tube 5 to the tank interior. In general, it is preferred that the cross-sectional area of stanchion opening 22 be at least as great as the cross-sectional area of fill tube 5 to permit free flow of the liquid from the fill tube into the tank.

Means 23 is associated with the upper end 20 of stanchion 19 for preventing theft of the liquid from tank 2. In general, theft preventing means 23 comprises means 24 for obstructing the interior of stanchion 19 to the introduction of a siphon tube or the like of greater than a predetermined size. In the embodiment illustrated in FIG. 2–FIG. 4, obstructing means 24 comprises a grid-like baffle plate 25 formed from pairs of perpendicularly arranged web-like members 26. It will be observed that the spaces or openings adjacent web-like member 25 will be sufficiently small to prevent the introduction of a siphon tube of sufficient size to drain the contents of tank 2 in a reasonable length of time. Consequently, a would-be thief may not be supplied with a sufficiently small siphon tube, and if so supplied, may be unwilling to risk the extended length of time necessary to siphon the contents of tank 2. Consequently, anti-theft device 1 of the present invention acts as a deterrent to provide the protection described hereinabove.

As best illustrated in FIG. 1, obstructing means 25 is positioned within stanchion 19 so as to be spaced above the highest liquid level within tank 2. Furthermore, the central generally square opening 27 of the obstructing means will generally be no greater than about $\frac{3}{4}$ to $1\frac{1}{2}$ inches in depth and width to facilitate the passage of a dip stick or measuring rod, shown diagrammatically at 28, for measuring the amount of liquid remaining in tank 2.

It will be observed that stanchion 19 acts as a structural support for obstructing means 24 in order to prevent the obstructing means 24 from being forced downwardly to a position below the liquid level within tank 2 by a blow to the top of the structure. Consequently, the theft prevention device 1 of the present invention overcomes limitations experienced with prior art anti-theft devices which may be forceably defeated by a pole or rod inserted into the fill tube.

As best shown in FIG. 1, theft preventing device 1 also includes means for preventing removal of stanchion 19 comprising a plurality of crimped projections 29 projecting inwardly from the inner surface of speed tube 9 above the upper end 20 of stanchion 19. It will also be understood that the removal preventing means may comprise a continuous internal ring-like crimped projection extending circumferentially around the inner surface of speed tube 9 above the upper end 20 of the stanchion. In any event, the projection prevents the upward withdrawal of stanchion 19 from within speed tube 9.

As noted hereinabove, there is included means associated with the filling means for preventing removal of the speed tube from the fill tube. In the embodiment illustrated, these means include annular collar 15 threadedly secured to the fill tube 5 to lock speed tube 9 in place. In addition, means are provided for preventing rotation of collar 15 in the form of threaded set screw means 30 extending laterally through a cooperating threaded aperture in collar 15, with the innermost end of set screw means 30 engaging the outer surface of fill tube 5. As best shown in FIG. 5, set screw means 30 may be loosened to permit rotation of collar 15 by insertion in pentagonal-shaped opening 31 of a complementary shaped keyed tool 32. In order to prevent unauthorized disassembly of threaded collar 15, it will be understood that set screw means 30 will be provided with a keyway 31 of an unconventional shape requiring the use of uniquely shaped keyed operating means, such as tool 32. It will thus be observed that only authorized personnel using the uniquely keyed operating means may gain access to the interior of fill tube 5 for removing the anti-theft device 1 for the purposes described hereinabove. At all other times, projections 29, in cooperation with the closed and secured upper end of the fill tube, prevent withdrawal of the anti-theft device.

Figure 7:
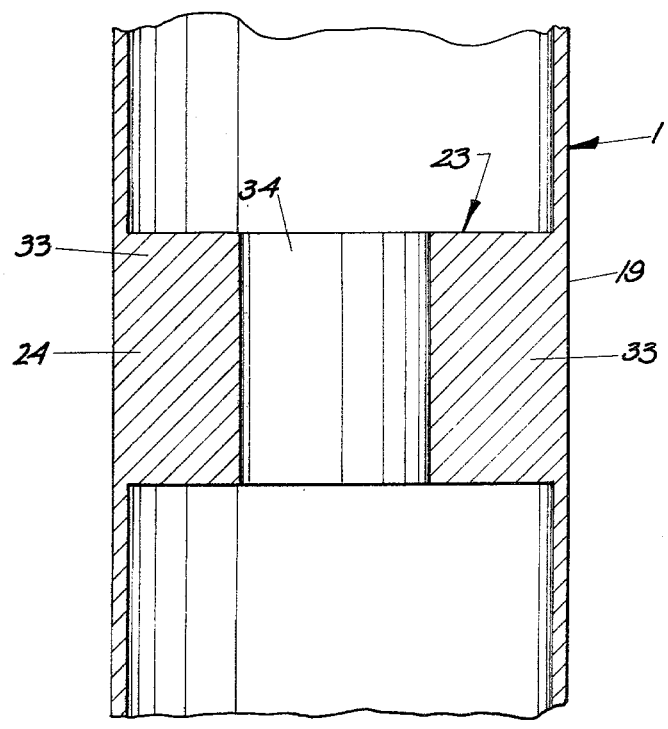
FIG. 7 is a fragmentary cross-sectional side elevation view of the alternative embodiment of FIG. 6.

An alternate embodiment for anti-theft device 1 is illustrated in FIG. 6 and FIG. 7. In this arrangement, obstructing means 23 comprises one or more generally semi-cylindrical projections 33 extending inwardly from the inner circumference of stanchion 19, and configured to prevent the insertion of a siphon tube greater than a predetermined size into tank 2. In a manner similar to that described hereinabove, a central opening 34 is maintained to permit the free passage of a dip stick or measuring rod 28.

In another alternative embodiment, stanchion 19 may be fixedly attached to speed tube 9 as by weldments 35 such as those illustrated in FIG. 4. In this arrangement, it will be understood that the inwardly extending projections 29 may be dispensed with, and the stanchion and speed tube inserted or removed from fill tube 5 as an integral unit.

In some instances, an unauthorized attempt may be made to withdraw the contents of tank 2 by impressing a vacuum at the upper end of fill pipe 5. To prevent unauthorized withdrawals in this manner, the wall of speed tube 9 may be provided with one or more openings or apertures 36 extending completely therethrough, and positioned above the maximum liquid level within tank 2 to operate as a vacuum breaker.

It will be understood that the various embodiments of the present invention may be installed as original equipment in a new liquid storage tank installation. Alternatively, the anti-theft device of the present invention may be incorporated in an existing liquid storage tank in order to provide retrofit capability. In this installation, collar 15 is removed from the upper end of the fill tube, and speed tube 9 withdrawn. Speed tube 9 may then be provided with inwardly extending projections 29 and aperture 36, or a new speed tube having these stanchion removal preventing and vacuum breaking means may be provided as desired. An elongated tube-like stanchion 5 may then be lowered into fill pipe 5 until the lower end 21 of the stanchion comes to rest against the bottom surface 13 of the storage tank 2. The modified speed tube is then lowered into fill pipe 5 surrounding stanchion 19 until the upper flange 10 comes to rest against the upper edge 12 of the fill pipe. Collar 15 may be provided with set screw means 30 or a new collar having those collar rotation preventing means may be provided as desired. Collar 15 including set screw means 30 is reassembled to the upper end of the fill pipe, and set screw means 30 tightened by means of key operating means or tool 32. A suitable sealing cap (not shown) may then be added to close the upper end of the fill tube, and the well cover (not shown) replaced.

It will be understood that various changes in the arrangements and details of parts which have been herein described and illustrated in order to explain the nature of the invention, may be made by those skilled in the art within the scope and principle of the invention as expressed in the appended claims.

The embodiments of the invention in which an exclusive property or privilege is claimed are as follows:

1. A device for preventing theft of liquid from a storage tank of the type having a liquid fill opening positioned on the upper surface of the tank, a hollow fill tube extending upwardly from the opening, and filling means associated with the upper end of the fill tube for introducing liquid into the tank, said theft preventing device comprising:

an elongated hollow tube-like stanchion positionable within the fill tube, the lower end of said stanchion being configured to rest upon the bottom of the liquid storage tank, said stanchion including an opening to permit flow of the liquid from the fill tube to the tank interior;

and a grid-like baffle plate having a plurality of transversely extending web members forming adjacent openings dimensioned to prevent the introduction of a siphon tube of greater than a predetermined size, attached to the interior of said stanchion.

2. The device according to claim 1 wherein said obstructing means includes at least one passageway permitting the passage of a dip stick measuring no more than about ¾ to 1½ inches in depth or width.

3. A method for preventing theft of liquid from a liquid storage tank of the type having a liquid fill opening positioned on the upper surface of the tank, a hollow fill tube extending upwardly from the opening, and filling means associated with the upper end of the fill tube for introducing liquid into the tank, said method including the steps of:

inserting into said fill tube an elongated tube-like stanchion having a lower end configured to rest upon the bottom of the liquid storage tank, an opening to permit flow of the liquid from the fill tube to the tank interior, and a grid-like baffle plate having a plurality of transversely extending web members forming adjacent openings dimensioned to prevent the introduction of a siphon tube of greater than a predetermined size, attached to the inside of said stanchion.

* * * * *